Patented Jan. 13, 1931

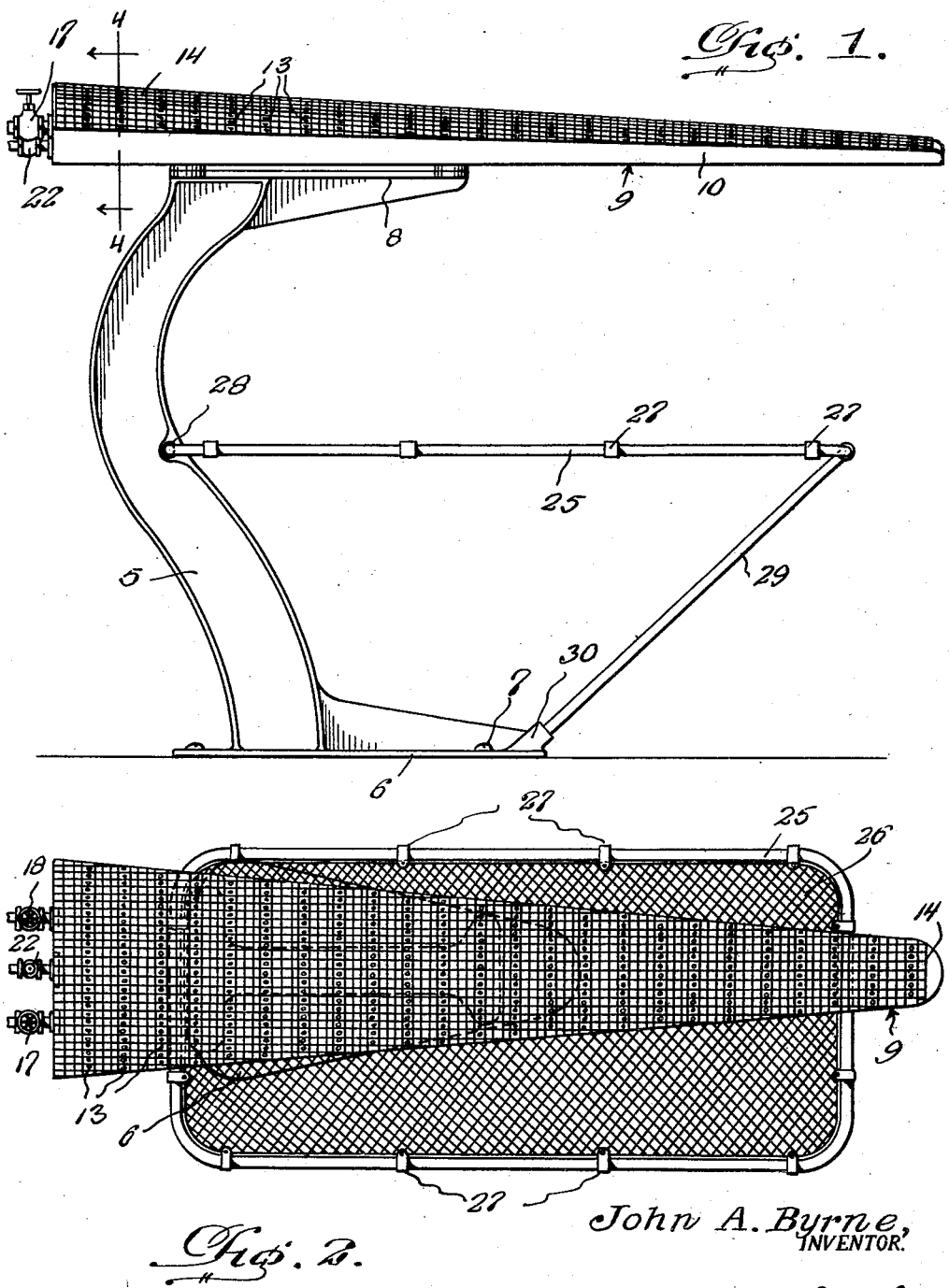

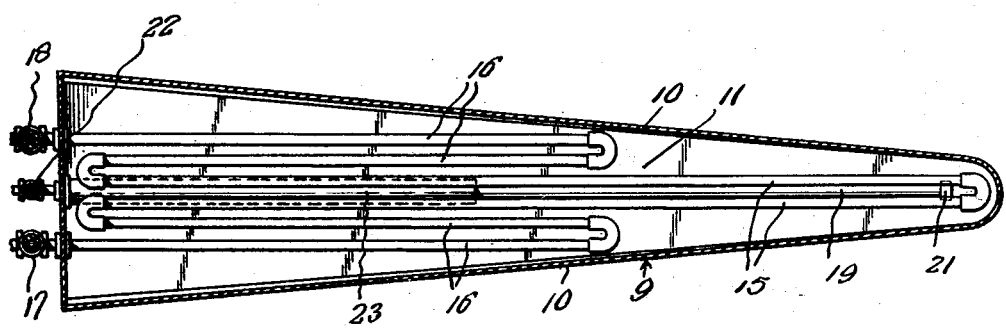
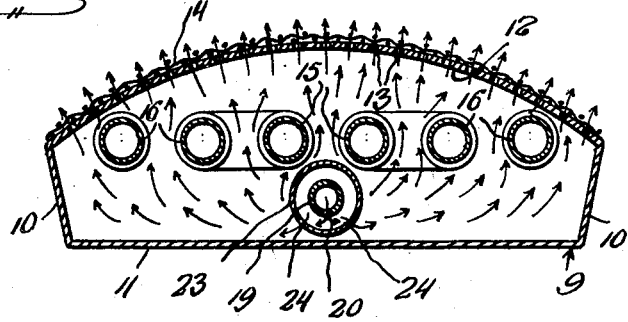
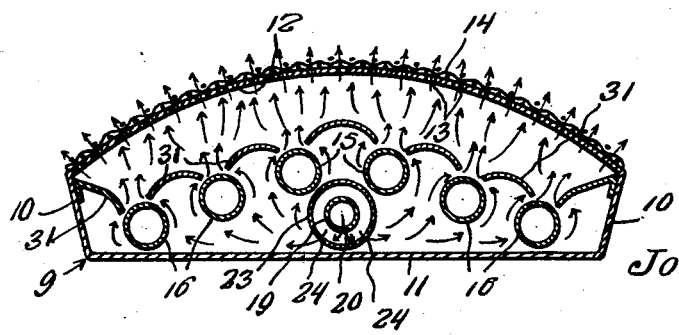

1,789,213

UNITED STATES PATENT OFFICE

JOHN A. BYRNE, OF MILTON, MASSACHUSETTS

STEAM BOARD

Application filed October 7, 1929. Serial No. 397,989.

This invention relates to apparatus of that type commonly known as steam boards and adapted for use in removing wrinkles from or raising the nap of fabrics by the passage of steam therethrough.

The primary object of this invention is to provide an improved apparatus of the above kind so constructed that only dry steam is allowed to contact with the material being renovated, thereby preventing injurious moisture from being left in the material to damage the fabric after it is cleaned.

A more particular object of the present invention is to provide a steam board having an internal heating coil so formed and arranged with respect to the steam-distributing pipe as to effectively heat the board and absorb any moisture of condensation that may be present in the steam, prior to passage of said steam into contact with the fabric being treated.

A still further object of the present invention is to provide a steam board of the above kind which is extremely simple and durable in construction, and thoroughly efficient and reliable in use.

The invention consists in the novel form, combination and arrangement of parts hereinafter more fully described, shown in the accompanying drawings and claimed.

In the drawings:

Figure 1 is a side elevational view of a steam board embodying the present invention.

Figure 2 is a top plan view thereof.

Figure 3 is a horizontal longitudinal sectional view of the steam shell, the line of section being on a plane to reveal the heating coil and steam distributor pipe in top plan.

Figure 4 is a vertical transverse section taken on line 4—4 of Figure 1 and drawn on an enlarged scale; and Figure 5 is a view similar to Figure 4 of a slightly modified form of the heating and steam distributing means within the steam shell.

Referring more in detail to the drawings, the present steam board comprises a suitable support embodying a standard 5 rigid with and rising from one end of a base 6 that may be secured by means of screws 7 or the like to a floor, table or other support, and a head 8 rigid with and extending horizontally from the upper end of the upright 5 so as to overhang the base 6 as shown clearly in Figure 1.

Rigidly fastened by riveting or the like to and upon the head 8 is a steam shell 9 consisting of a casing of non-corrosive metal and gradually tapering narrower from one end to the other. This casing is composed of imperforate side, end and bottom walls, and a perforated top wall, the side walls 10 being arranged in slightly upwardly diverging relation as shown in Figure 4, the bottom wall 11 being substantially flat, and the top wall 12 being of transversely upwardly arched form and provided with numerous small perforations 13 substantially throughout its entire length and width. A fine mesh wire screen 14 is placed over the perforations 13 and has its edges soldered to the shell 9, the purpose of this screen being to evenly spread the steam so that it will penetrate all parts of the goods being renovated.

Arranged within the shell 9 is a horizontal steam heating and absorption coil consisting of a U-shaped intermediate section arranged centrally of and extending substantially from end to end of the shell 9, and shorter outer U-shaped sections 16 disposed at opposite sides of the intermediate section 15 and extending from a point adjacent the larger end of the shell 9 to a point substantially intermediate the ends of the latter. The other legs of the shorter outer coil sections 16 extend through the larger end of the shell 9 where they are provided with suitable control valves 17 and 18 for respectively regulating the supply of steam to and exhaust of the steam from the heating and absorption coil.

Arranged centrally of and extending substantially from end to end of the shell 9 directly beneath the intermediate section 15 of the heating and absorption coil is a steam distributing pipe 19 having small perforations in the bottom thereof and throughout its length as at 20. The end of the pipe 19 adjacent the smaller end of the shell 9 is closed by a suitable cap 21, while the opposite end of said pipe 19 extends through the larger end of the shell 9 where it is provided with a suitable control valve 22 for permitting regulation of the supply of steam thereto. Surrounding and arranged in spaced concentric relation to the portion of the steam distributing pipe 19 disposed within the wider end portion of the shell 9 is a cylindrical casing 23 having a longitudinal series of perforations 24 in each lower side portion thereof and substantially from end to end of the same.

A suitable garment supporting crib is carried by the supporting stand of the steam board, and such crib preferably consists of an elongated substantially rectangular frame formed of tubular metal, and a cord or wire mesh cribbing 26 fitting within the frame 25 and secured at its marginal edges to the latter by means of suitable clamps 27 or the like. The garment crib is sustained in a horizontal position beneath the steam shell by extending an end of the frame 25 through a transverse opening 28 in the standard 5 and engaging the opposite end of the frame 25 with the upper end of a supporting bar 29 which inclines downwardly toward the base 6 and is engaged at its lower end in a socket 30 carried by the latter.

In using the present steam board, the fabric or garment is arranged on the shell 9 with any overhanging portion thereof sustained by the garment crib to prevent its contact with the floor or other support upon which the device is mounted. The valves 17 and 18 are then opened to permit the circulation of steam through the heating and absorption coil, and when the board has reached a desired temperature, the valve 22 is opened so as to permit the discharge of steam from the steam distributing pipe 19 through the bottom perforations 20 thereof. The steam issuing from the steam distributing pipe at the narrower end of the shell 9 will strike the bottom of the latter and be deflected toward opposite sides of the same, thereafter rising upwardly and passing through the perforations 13 into and through the garment or fabric being treated. In order to insure proper lateral distribution of the steam in the wider end of the shell 9, the casing 23 is provided. At this point the steam emerging from the distributing pipe 19 is deflected laterally by the bottom of the casing 23, passing outwardly through the perforations 24 of the latter in a downward and lateral direction. This obviously effects the desired lateral distribution of the steam in the wider end of the shell 9, and as the steam rises it passes the side sections 16 of the heating coil so as to have any water of condensation effectively absorbed therefrom. In a like manner, the steam rising in the narrower end of the shell 9 passes the adjacent portion of the intermediate heating coil section 15 so as to be properly dried before passing through the top of the shell into contact with the fabric or garment.

The construction above described with respect to Figures 1 to 4 inclusive is particularly adapted for use where a supply of comparatively dry steam is available, but when steam containing considerable moisture must be used, the modified construction of Figure 5 is preferably employed. The construction of Figure 5 is quite similar to that of Figures 1 to 4 inclusive except that the legs of the coil sections 15 and 16 are preferably arranged in transversely arched formation as shown clearly in said Figure 5, and suitable baffle plates 31 are mounted within the shell 9 directly above the legs of the heating and absorption coil. As shown, a baffle is disposed between each pair of adjacent legs of the coil sections 15 and 16 and at the outer side of the legs of the coil sections 16, the longitudinal edges of said baffle being extended to a point slightly spaced from such legs of the coil sections to provide restricted passages for the flow of steam between the longitudinal edges of the baffle and the legs of the heating coil. In this way the steam is caused to pass in intimate contact with the legs of the heating coil so that the steam laden with considerable moisture will be effectively dried before passing through the top of the shell 9 into contact with the fabric or garment being renovated. Otherwise, the construction of Figure 5 is similar to that of Figure 4 and corresponding parts are designated by like reference characters.

What I claim as new is:

1. A steam board including a support, a steam shell mounted on said support, said shell being of flat-like form and tapering from one end to the other, said steam shell further having a top wall perforated substantially throughout its length and width, a heating and absorption coil arranged within the steam shell and embodying an intermediate section arranged centrally of and extending substantially from end to end of said shell, and shorter outer sections arranged at opposite sides of the intermediate section and extending substantially from the larger end of the steam shell to a point intermediate the ends of the latter, means whereby steam may be circulated through said heating and absorption coil, a steam distributing pipe arranged centrally of and extending substantially from end to end of said shell beneath the intermediate section of the heating and absorption coil and having bottom outlet perforations therein substantially from end to end of the same, and means for supplying steam to said distributing pipe.

2. A steam board including a support, a tapered steam shell mounted on said support and having perforations in the top thereof substantially throughout the length and width of the same, means for supplying steam to the interior of said shell including a perforated steam distributing pipe extending centrally and substantially from end to end of said shell, and a steam heating and absorption coil arranged within the steam shell above said distributing pipe, said heating and absorption coil comprising an intermediate section overlying the distributing pipe and extending from end to end of the steam shell and shorter side sections arranged in the wider end portion of said steam shell at opposite sides of said intermediate section.

3. A structure as specified in claim 2 wherein a casing surrounds the distributing pipe for the portions of the length thereof located within the wider end portion of the shell, and wherein said casing is provided with longitudinal rows of perforations in the lower side portions thereof to effect lateral distribution of the steam issuing from the distributing pipe within the wider end portion of the steam shell.

4. A steam board including a support, a tapered steam shell mounted on said support and having perforations in the top thereof substantially throughout the length and width of the same, means for supplying steam to the interior of said shell including a perforated steam distributing pipe extending centrally and substantially from end to end of said shell, and a steam heating and absorption coil arranged within the steam shell above said distributing pipe, said heating and absorption coil comprising an intermediate section overlying the distributing pipe and extending from end to end of the steam shell and shorter side sections arranged in the wider end portion of said steam shell at opposite sides of said intermediate section, said coil sections comprising U-shaped members having the legs thereof spaced apart, and baffles arranged above and extending between adjacent pairs of legs of said coil sections, the longitudinal edges of said baffles extending into close proximity with said legs of the coil sections to cause intimate contact of the steam with the latter in passing upwardly from the distributing pipe through the top of the steam shell.

5. A steam board including a support, a steam shell mounted on said support, said shell being of flat-like form and tapering from one end to the other, said steam shell further having a top wall perforated substantially throughout its length and width, a heating and absorption coil arranged within the steam shell and embodying an intermediate section arranged centrally of and extending substantially from end to end of said shell, and shorter outer sections arranged at opposite sides of the intermediate section and extending substantially from the larger end of the steam shell to a point intermediate the ends of the latter, means whereby steam may be circulated through said heating and absorption coil, a steam distributing pipe arranged centrally of and extending substantially from end to end of said shell beneath the intermediate section of the heating and absorption coil and having bottom outlet perforations therein substantially from end to end of the same, and means for supplying steam to said distributing pipe, the top of said steam shell being of transversely upwardly arched form, and said shell having imperforate upwardly diverging side walls and a flat imperforate bottom wall.

In testimony whereof I affix my signature.

JOHN A. BYRNE.